Dec. 28, 1954   L. E. CROSBY ET AL   2,697,940
CONTROL FOR AIR BOXES

Filed Oct. 28, 1947   4 Sheets-Sheet 3

INVENTOR
LAWRENCE E. CROSBY
BY  CARL F. HAYDEN

ATTORNEY 2,697,940

Patented Dec. 28, 1954

United States Patent Office

2,697,940

CONTROL FOR AIR BOXES

Lawrence E. Crosby, Minneapolis, Minn., and Carl F. Hayden, Chicago, Ill., assignors to Bendix Aviation Corporation, South Bend, Ind., a corporation of Delaware Application October 28, 1947, Serial No. 782,640

4 Claims. (Cl. 73—118)

The present invention relates to a control mechanism and more particularly to a fluid control mechanism for regulating a plurality of pressures.

One of the principal objects of the present invention is to provide a control mechanism for automatically controlling a plurality of fluid pressures to maintain a predetermined variable relationship between said pressures.

Another object of the invention is to provide a mechanism for controlling a plurality of fluid pressures wherein any one or all of said pressures may be varied by a single mechanical manipulation to obtain various predetermined relationships between the pressures.

Another object of the invention is to provide a pressure regulating mechanism for controlling the pressure at a plurality of points in a single fluid conduit.

Still another object of the invention is to provide an adjustable fluid control mechanism for automatically maintaining a plurality of pressure levels in the air conduit of a carburetor testing apparatus.

Further objects and advantages will be apparent from the following description and accompanying drawings wherein one specific embodiment of our control mechanism and two applications thereof are given. In the drawings.

Figure 1:
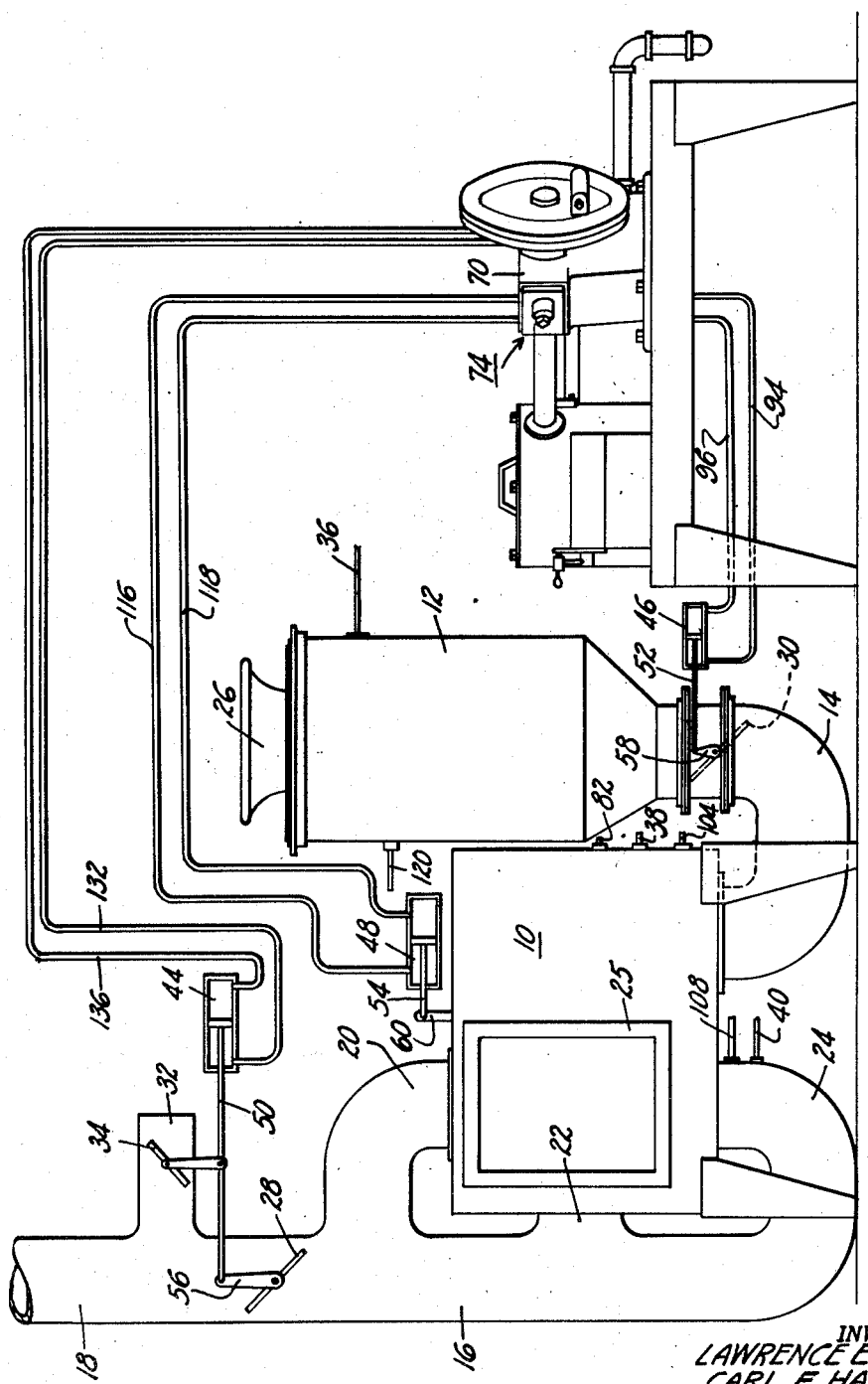
Figure 1 is an elevation of a carburetor testing apparatus and an assembly of the present control mechanism shown operatively connected to said apparatus.
Figure 2:
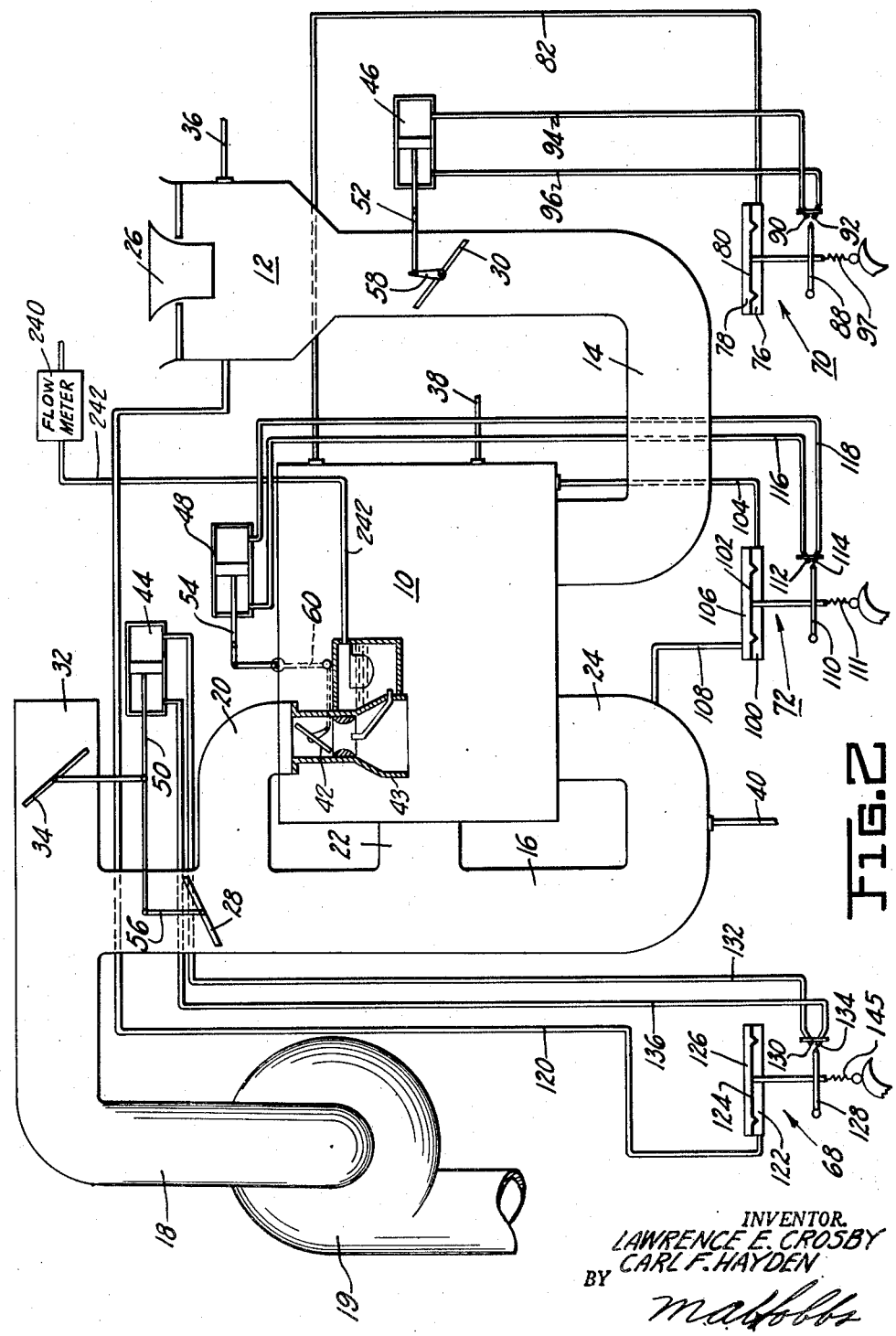
Figure 2 is a diagrammatical view of the carburetor testing apparatus, together with said elements of the control mechanism, showing their functional relationship to the controlled elements of said apparatus.
Figure 3:
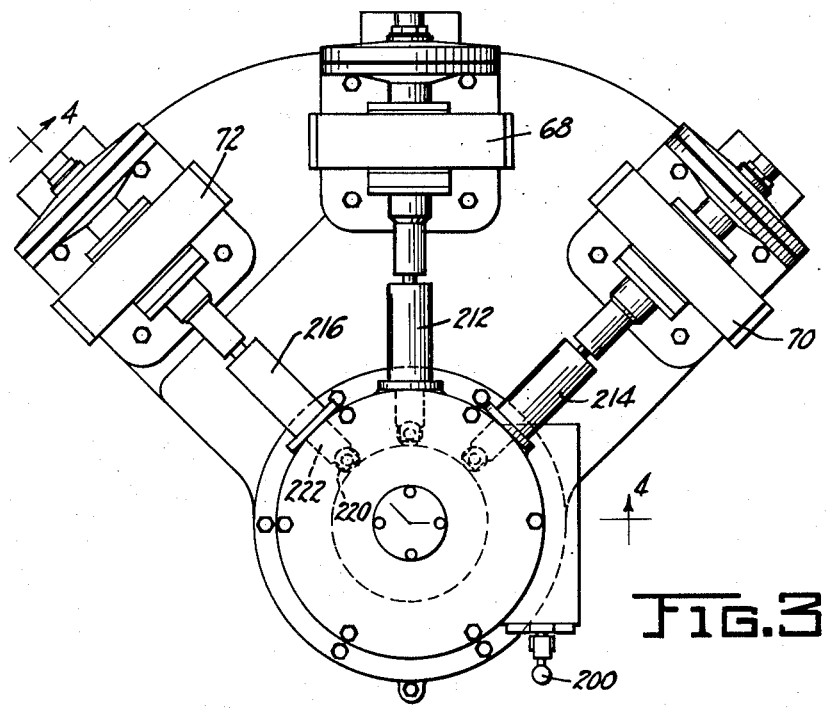
Figure 3 is a top plan view of the control mechanism.

Referring more particularly to Figure 1, numeral 10 designates an air box, 12 an air bottle, 14 an air inlet conduit connecting said air box and air bottle, and 16 an air manifold which is connected by conduit 18 to a conventional vacuum pump or the like 19 (Figure 2). The manifold 16 is connected by branch conduit 20 with the top of said air box, by horizontal branch passage 22 with one side of the box, and by branch conduit 24 with the bottom of the box in order to provide convenient means of testing updraft, horizontal and downdraft type carburetors. In the test, the carburetor is mounted in the air box on a suitable adaptor over the entrance to one of said branch conduits, and the closures, preferably steel plates, are bolted in place over the remaining entrances to the conduits. An airtight door 25 is provided in the air box adjacent said entrances and contains a large centrally located glass panel to permit observation of the carburetor being tested. For metering the air used in the testing procedure, the air intake port of air bottle 12 contains an accurately made air metering orifice 26 through which the air flow is controlled by the manipulation of main valve 28 and the carburetor throttle valve for simulating ground level operations and main valve 28 and valve 30 for simulating altitude conditions. Valve 30 remains wide open for ground level operations, and the carburetor throttle valve is usually held in wide open position for altitude conditions, as will be more fully explained hereinafter. A by-pass 32 controlled by a valve 34 is provided to relieve the high vacuum in conduit 18 which is created therein when main valve 28 is moved to closed or nearly closed position. The pressures in air bottle 12, air box 10 and manifold 16 are measured for the purpose of the determinations in the carburetor testing procedure by manometers (not shown) connected to said chambers by conduits 36, 38 and 40.

Fundamentally, the carburetor testing apparatus is a device for producing an airstream comparable to that which would exist in actual operation of the carburetor. Fuel is fed to the carburetor from a measurable supply means and from there is metered in the carburetor in the usual manner. By measuring the flow of air and fuel and by varying the airstream and density of the air entering the carburetor, it is possible to obtain the mixture ratios and other flow characteristics corresponding to every engine operating condition of service. In making a test, the apparatus must first be adjusted to admit the required quantity of air under predetermined atmospheric conditions and manifold pressure. For example, after the proper sized orifice 26 has been selected and the vacuum pump is placed in operation, valve 28 is adjusted to give the required drop across the orifice 26 and the required pressure in manifold 16 for a particular determination. When a given setting of the air valves, including the carburetor throttle valve, has been made, subsequent adjustments of any one of the valves automatically entails readjustment of the other valves. The manipulation of these valves has previously been made by manually adjusting each valve individually and manually readjusting all the valves for each separate determination made in the test.

In the present automatic pressure control mechanism, valves 28 and 30 and the throttle valve 42 of the carburetor 43 are actuated by hydraulic power cylinders 44, 46 and 48, respectively, through rods 50, 52 and 54 and levers 56, 58 and 60, respectively. Hydraulic cylinder 44 also actuates valve 34 of the by-pass conduit so that as valve 28 is closed, valve 34 is opened in order to avoid placing undue load on the vacuum pump when low air flow is required for the test. The power cylinders 44, 46 and 48 are controlled by regulators 68, 70 and 72 of the control assembly, generally shown at 74. The particular type of regulator shown in the drawings has been included only for the purpose of illustration and may be replaced by any other suitable type of regulator without departing from the scope of the present invention. Referring specifically to Figure 2, regulator 70, which controls power cylinder 46 for actuating valve 30, is operated by a pressure responsive element consisting of chambers 76 and 78 separated from one another by a flexible diaphragm 80. Chamber 78 is vented to the atmosphere while chamber 76 communicates with air box 10 through conduit 82 and therefore contains a pressure equal to that in said box. Regulator 70 includes a pivoted jet pipe 88, actuated by said diaphragm, and two closely positioned orifices 90 and 92 adjacent the discharge end of said pipe, from which lead conduits 94 and 96 to opposite ends of power cylinder 46. The movement of said jet pipe by diaphragm 80 is opposed by a compression spring 97, and by varying the tension of said spring, the control mechanism may be regulated to provide various pressures in air box 10. Oil or other suitable fluid is pumped through pipe 88 and is discharged into orifices 90 and 92. When oil pipe 88 is in mid-position between said orifices, an equal volume of oil is directed into each orifice so that the pressures in conduits 94 and 96 and in each end of cylinder 46 are equal; consequently, valve 30 is held in fixed position. If the pressure in air box 10 should vary from the desired value, as for example, if the pressure should rise above that required for a predetermined altitude condition being maintained in air box 10, the increased pressure would be transmitted to chamber 76 to urge diaphragm 80 toward chamber 78, thus shifting jet pipe 88 to the position at which it would discharge oil more directly into conduit 94 than 96, causing the pressure in conduit 94 to increase and the pressure in conduit 96 to decrease. The differential in pressures thus created is transmitted to cylinder 46, causing the piston in said cylinder to move to the left, as shown in the drawings, urging air valve 30 toward closed position. As valve 30 is closed, the pressure in air box 10 is lowered to the desired value, thus re-establishing the proper subatmospheric condition in the air box. When the pressure returns to its original value, the diaphragm assumes its original position, and jet pipe 88 returns to its mid-position between orifices 90, 92; thus, the pressures in conduits 94 and 96 again become equal to one another so that the piston in cylinder 46 remains stationary and holds air valve 30 in its newly adjusted position.

Regulator 72, which controls power cylinder 48 for actuating the throttle valve of the carburetor, is substantially the same in construction and operation as regulator 70, described above. In regulator 72, chamber 100 on one side of diaphragm 102 communicates through conduit 104 with the air box, and chamber 106 on the other side of said diaphragm communicates through conduit 108 with manifold 16. Thus, diaphragm 102 actuates jet pipe 110 according to the variations in the differential between the pressures prevailing in the air box 10 and the manifold 16. Selection of the desired pressure differential is made by adjusting the tension on spring 111. Jet pipe 110 discharges oil into orifices 112 and 114 which are connected to opposite ends of cylinder 48 by conduits 116 and 118. If the pressure drop across the carburetor should vary from that desired, as for example, if the drop in pressure should become greater than a predetermined value when the pressure in box 10 is being maintained at ground level pressure, diaphragm 102 moves toward chamber 106 and shifts jet pipe 110 toward orifice 112, causing the pressure in conduit 116 to rise and that in conduit 118 to fall. The unequal pressures are transmitted to opposite ends of cylinder 48, causing the piston therein to shift to the right, thus urging the throttle valve of the carburetor in the opening direction. The increased air flow through the carburetor lessens the differential between the pressures on either side of the carburetor, returning said differential to its original value.

Regulator 68 for controlling the power cylinder 44 of the main valve 28 is the same in construction and operation as regulator 70 and is actuated in response to variations in the pressure of air bottle 12. The pressure of the air bottle is transmitted through conduit 120 to chamber 122 on one side of diaphragm 124. Chamber 126 which is on the other side of said diaphragm is vented to the atmosphere; thus, the diaphragm is controlled by the differential across air metering orifice 26, that is, the differential between the atmospheric pressure and that prevailing in the air bottle 12. An increase in pressure in the air bottle causes diaphragm 124 to move toward chamber 126 and to move jet pipe 128 toward orifice 130 of conduit 132 and away from orifice 134 of conduit 136, thus increasing the pressure in conduit 132 and decreasing that in conduit 136. These unequal pressures are transmitted by said conduits to opposite ends of cylinder 44, causing the piston in said cylinder to shift to the left and to open further valve 28. The opening of valve 28 causes a lowering of the pressure in air bottle 12 and a consequent increase in air flow through air metering orifice 26. The desired pressure is selected by adjusting the tension on spring 145. When the above described regulators are set for any particular test determination, they automatically maintain the desired condition without further adjustment.

Figure 4:
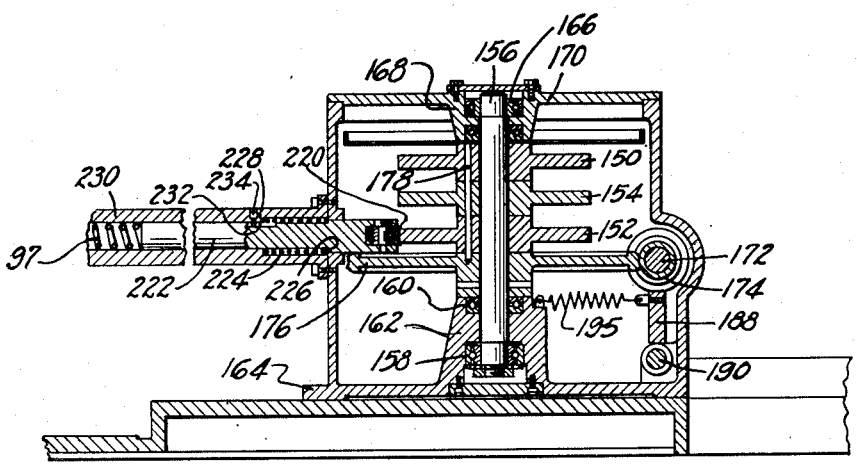
Figure 4 is a vertical section through the control mechanism.
Figure 5:
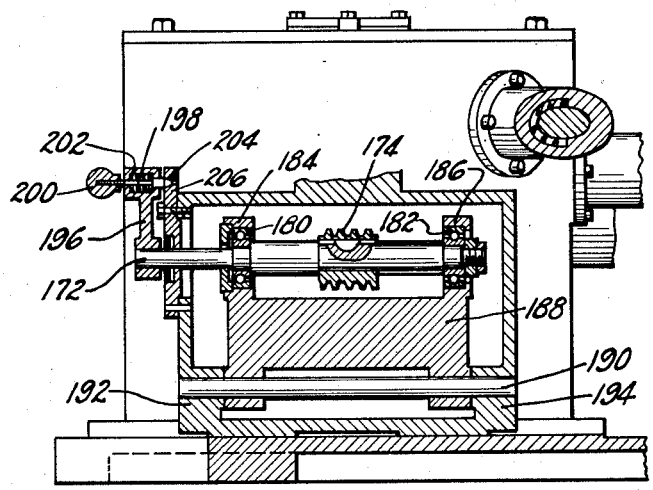
Figure 5 is a side elevation of the housing of the control mechanism, a portion thereof being broken away to show more fully the manual control element.

The control mechanism, shown generally at 74, Figure 1, includes a means for adjusting the three regulators simultaneously by a single manual manipulation. This is accomplished by a plurality of cams adapted to rotate in unison for varying the tension on springs 97, 111 and 145. Referring to Figure 4, cams 150, 152 and 154 of regulators 70, 72 and 68, respectively, are mounted on vertical shaft 156 journaled at its lower end in bearings 158 and 160 seated in boss 162 of housing base 164 and at its upper end in bearing 166 seated in boss 168 of cover 170. The cams are rotated manually through shaft 172, worm 174 and worm gear 176, said worm gear and cams being held in fixed relation to one another by key 178. Shaft 172 is journaled in bearings 180 and 182 mounted in arms 184 and 186 of shaft support 188, said shaft support being pivoted at the bottom on shaft 190 journaled in bosses 192 and 194 of the housing base. Shaft support 188 is urged by coil spring 195 in the direction to mesh worm 174 and gear 176 in order to prevent backlash of said gears and to eliminate play of the cams in relation to the cam followers. A crank 196 for turning shaft 172 is mounted on the end thereof and is provided with a latching means consisting of a stem 198 having a hand knob 200 on one end thereof and a spring 202 adapted to urge the other end of said stem into hole 204 in the face of plate 206.

The cam followers generally shown at 212, 214 and 216 for adjusting regulators 68, 70 and 72 are adapted to vary the tension on springs 145, 97 and 111 respectively, and thereby to vary the pressures in the manifold, air box and air bottle. Since the three cam followers are alike, only one will be described in detail. Referring to cam follower 216, a roller 220 is mounted in the bifurcated end of axially movable shaft 222 and is urged into engagement with cam 152 by a coil spring 224 reacting between shoulder 226 of shaft 222 and shoulder 228 of shaft housing 230. Shaft 222 is prevented from rotating by longitudinal slot 232 in said shaft and set key 234 inserted therein.

When the operator desires to make an adjustment of the regulators, he pulls knob 200 outwardly until the end of stem 198 is withdrawn from hole 204 and then rotates crank 196 and consequently cams 150, 152 and 154 to the position at which the next determination is to be made. The cams are contoured to give the desired relation between the pressures in the manifold, air box and air bottle. After the setting has been made, the pressure regulators maintain the desired pressure in each of the said chambers until a new adjustment is made by the rotation of said cams.

In ground level tests on carburetors, such as the one shown at numeral 43 in Figure 2, valve 30 is maintained in wide open position in accordance with the contour of cam 150, so that the pressure prevailing in air box 10 will be substantially equal to the ground level pressure. The pressure in the air box nevertheless is slightly lower than the ground level pressure since a drop in pressure must be maintained across metering orifice 26 in order to measure the amount of air flow through the carburetor in the test. The drop in pressure across orifice 26 is observed on an inclined manometer calibrated to indicated air flow in pounds per hour. After passing through said orifice, the air flows through air bottle 12 and air box density control valve 30 into air box 10, thence through the carburetor being tested to vacuum pump 19. For each setting of the control means 74, a predetermined air flow through the carburetor is selected by the cams 152 and 154 and is maintained by regulator 68 and 72 acting through valves 28 and 34 and the throttle valve 42 of the carburetor. The fuel delivered by the carburetor for each setting is determined by a flow meter diagrammatically shown at numeral 240 disposed in conduit 242 supplying fuel to the carburetor. From the air and fuel flow determinations, the richness of the fuel-air mixture delivered by the carburetor is determined. In making tests in which altitude conditions are simulated, valve 30 is moved to a partially closed position by the adjustment of cam 150 in unison with cams 152 and 154, to provide a reduced pressure in the air box comparable to that existing at a preselected altitude. In this test, the throttle valve is usually maintained in wide open position since altitude tests are principally used for testing automatic mixture control units which can be satisfactorily tested with one setting of the throttle valve; however, cam 152 can be contoured such as to give any desired part-throttle determination. When a test for one predetermined air flow has been completed, the control unit 74 is adjusted by the rotation of the three cams in unison to the next setting for another predetermined air flow test. With the control unit embodied in the present apparatus, it is only necessary in making the setting to rotate crank 196 of the control unit. Thus, it is seen that individual adjustment of each valve has been eliminated by the present control unit.

Figure 6:
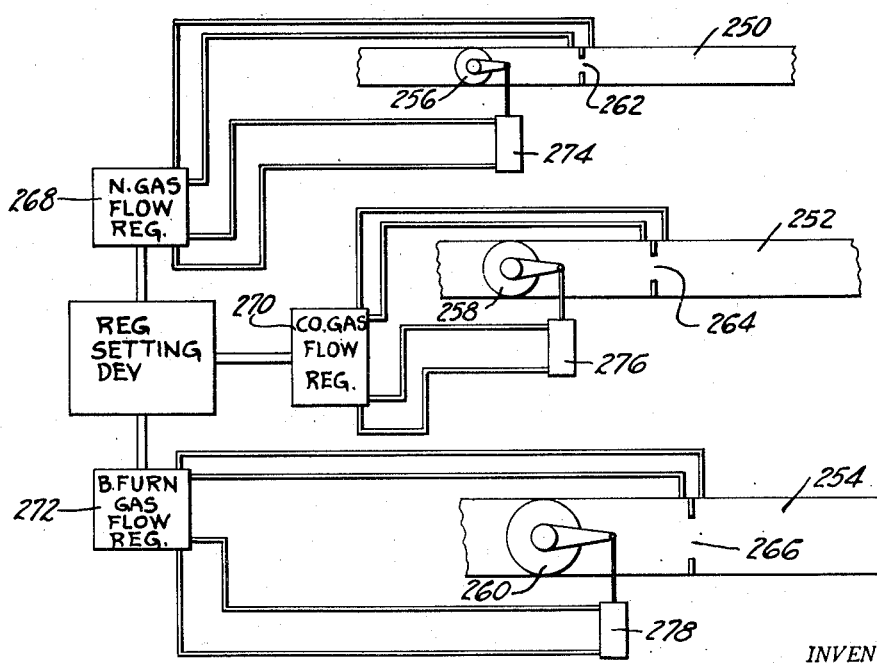
Figure 6 is a schematic view of another application of the present control mechanism.

In Figure 6, the present pressure control mechanism is shown schematically in an arrangement for maintaining a predetermined pressure relationship between a plurality of fluid conduits. For example, in the drawings, an arrangement for mixing definite quantities of natural gas, carbon monoxide and blast furnace gas is shown comprising conduits 250 for natural gas, 252 for carbon monoxide and 254 for blast furnace gas, controlled by valves 256, 258 and 260, respectively. The quantity of gas flowing through the conduits is determined by the pressure differential across orifices 262, 264 and 266. The regulators 268, 270 and 272, which may be identical to those previously described herein, respond to variations in said differential and actuate hydraulic power cylinders 274, 276 and 278 which in turn open or close their respective valves to re-establish the required pressure differential for a predetermined flow of gas. The three regulators are adjusted to obtain various mixture ratios by a cam arrangement comparable to that shown in Figure 4 of the drawings.

It is contemplated that other arrangements of elements than those shown in the accompanying drawings may be provided without departing from the scope of the present invention. Additional modifications of the present fluid pressure control mechanism as well as other uses therefor will occur to those skilled in the art.

We claim:

1. In a testing apparatus for carburetors having a throttle valve: an air bottle; an air box; a conduit connecting said air bottle and air box; a valve in said conduit; an exhaust conduit for said air box having a control valve therein; a regulator responsive to the pressure in said air box for controlling the first mentioned valve; another regulator responsive to the pressure in said air bottle for controlling the second mentioned valve; a regulator responsive to the differential in pressures between said air box and exhaust conduit for controlling the throttle valve of the carburetor being tested; and a mechanism for adjusting said regulators simultaneously to give various predetermined relationships between the pressures in said air bottle, air box and exhaust conduit.

2. In a testing apparatus for carburetors having a throttle valve: an air bottle; an air box; a conduit connecting said air bottle and air box; a valve in said conduit; an exhaust conduit for said air box having a control valve therein; a regulator responsive to the pressure in said air box for controlling the first mentioned valve; another regulator responsive to the pressure in said air bottle for controlling the second mentioned valve; a regulator responsive to the differential in pressures between said air box and exhaust conduit for controlling the throttle valve of the carburetor being tested; and a mechanism for adjusting said regulators simultaneously to give various predetermined relationships between the pressures in said air bottle, air box and exhaust conduit, said mechanism comprising a cam for each regulator; cam followers between said cams and said regulators; and a means for rotating said cams in unison to vary the pressures maintained by said regulators.

3. In a testing apparatus for carburetors having a throttle: a chamber, an air inlet passage for said chamber; an air outlet passage for said chamber; valves in said inlet and outlet passages; a means for supporting carburetors in said chamber; a regulator responsive to the pressure in said chamber for controlling the valve in the inlet passage; a regulator responsive to the pressure in said inlet passage anterior to the valve therein for controlling the valve in the outlet passage; a regulator responsive to the differential between the pressure in said chamber and the pressure in said outlet passage for controlling the throttle of a carburetor being tested; and a mechanism for simultaneously adjusting said regulators to give various predetermined relationships between the pressures in said inlet passage, chamber, and outlet passage.

4. In a testing apparatus for carburetors having a throttle: a chamber; an air inlet passage for said chamber; an air outlet passage for said chamber; valves in said inlet and outlet passages; a calibrated restriction in said inlet passage anterior to said valve; a means for supporting carburetors in said chamber; a regulator responsive to the pressure in said chamber for controlling the valve in the inlet passage; a regulator responsive to the pressure in said inlet passage between said restriction and the valve therein for controlling the valve in the outlet passage; a regulator responsive to the differential between the pressure in said chamber and the pressure in said outlet passage for controlling the throttle of a carburetor being tested; and a mechanism for simultaneously adjusting said regulators to give various predetermined relationships between the pressures in said inlet passage, chamber, and outlet passage.

References Cited in the file of this patent

UNITED STATES PATENTS

| Number | Name | Date |
|---|---|---|
| 1,787,686 | Kerr | Jan. 6, 1931 |
| 1,850,133 | Munzinger | Mar. 22, 1932 |
| 2,345,524 | Ziebolz | Mar. 28, 1944 |
| 2,345,525 | Ziebolz | Mar. 28, 1944 |
| 2,351,027 | Ewart | June 13, 1944 |

FOREIGN PATENTS

| Number | Country | Date |
|---|---|---|
| 26,896 | Denmark | Nov. 1920 |